(12) United States Patent
Pyper

(10) Patent No.: US 10,919,274 B2
(45) Date of Patent: Feb. 16, 2021

(54) COLOURING STRUCTURE

(71) Applicant: BOTI Global Limited, Kowloon (HK)

(72) Inventor: Gary Pyper, Hemel Hempstead (GB)

(*) Notice: Subject to any disclaimer, the term of this patent is extended or adjusted under 35 U.S.C. 154(b) by 234 days.

(21) Appl. No.: 15/767,622

(22) PCT Filed: Dec. 20, 2016

(86) PCT No.: PCT/CN2016/110939
§ 371 (c)(1),
(2) Date: Apr. 11, 2018

(87) PCT Pub. No.: WO2018/098859
PCT Pub. Date: Jun. 7, 2018

(65) Prior Publication Data
US 2019/0168535 A1 Jun. 6, 2019

(30) Foreign Application Priority Data

Dec. 2, 2016 (CN) .................... 2016 2 1316263 U

(51) Int. Cl.
*B23B 27/10* (2006.01)
*B32B 27/10* (2006.01)
*B32B 23/06* (2006.01)

(52) U.S. Cl.
CPC .............. *B32B 27/10* (2013.01); *B32B 23/06* (2013.01); *Y10T 428/24843* (2015.01)

(58) Field of Classification Search
CPC ........... B44C 5/043; Y10T 428/249921; Y10T 428/249926

(Continued)

(56) References Cited

U.S. PATENT DOCUMENTS 3,802,630 A * 4/1974 Lee ................. D21B 1/063
241/18
2001/0018113 A1* 8/2001 Mallol ................. D21F 1/44
428/195.1

(Continued)

FOREIGN PATENT DOCUMENTS

CN 2563000 Y 7/2003
CN 201012615 Y 1/2008

(Continued)

OTHER PUBLICATIONS

PCT International Search Report; Application No. PCT/CN2016/110939; dated Sep. 12, 2017; 5 pages.

(Continued)

*Primary Examiner* — Betelhem Shewareged
(74) *Attorney, Agent, or Firm* — Conley Rose, P.C.; Grant Rodolph; Joseph J. Funston, III

(57) ABSTRACT

A colouring structure comprising: a substrate, and a colouring layer disposed on at least a part of the substrate; the substrate and the colouring layer are made from different materials and have different water absorption properties, the colouring structure comprises a plurality of colouring areas and at least one separating area, wherein the colouring area is at least partially defined by the separating area. The colouring structure allows the user to easily grasp the pattern engraved on the colouring structure, which can rapidly absorb the liquid such as ink added to the surface thereof and effectively slow the horizontal diffusion of the liquid added to the colouring layer. For liquids with high water content, the high water absorption of the colouring structure avoids or effectively reduces accidents caused by the use of high-water-content liquids, such as liquid leakage, and liquid spillage and dirtying clothes or body parts over large areas.

18 Claims, 2 Drawing Sheets

(58) Field of Classification Search
USPC .................................................. 428/195.1
See application file for complete search history.

(56) References Cited

U.S. PATENT DOCUMENTS

| | | | | |
|---|---|---|---|---|
| 2005/0014442 A1* | 1/2005 | Wittmeyer, Jr. | ....... | G09B 11/06 |
| | | | | 446/147 |
| 2009/0169777 A1* | 7/2009 | Missell | .................. | B41M 5/504 |
| | | | | 428/32.22 |
| 2011/0212295 A1* | 9/2011 | Rueckert | .................. | B32B 3/30 |
| | | | | 428/141 |
| 2015/0368858 A1 | 12/2015 | Schneider et al. | | |
| 2019/0168535 A1* | 6/2019 | Pyper | ........................ | B44C 5/04 |

FOREIGN PATENT DOCUMENTS

| | | | | |
|---|---|---|---|---|
| CN | 202007365 U | * | 10/2011 | ............ D21H 23/56 |
| CN | 202098222 U | | 1/2012 | |
| CN | 205258999 U | | 5/2016 | |
| HK | 1230407 A | | 12/2017 | |
| JP | 07329496 A | | 12/1995 | |

OTHER PUBLICATIONS

PCT Written Opinion of the International Searching Authority; Application No. PCT/CN2016/110939; dated Sep. 12, 2017; 4 pages.

* cited by examiner

COLOURING STRUCTURE

CROSS REFERENCE TO RELATED APPLICATIONS

This application claims the priority of International Patent Application No. PCT/CN2016/110939 filed Dec. 20, 2016, which claims priority of Chinese Patent Application No. 201621316263.4, filed on Dec. 2, 2016, the entire contents of which are hereby incorporated by reference in their entireties.

TECHNICAL FIELD

This application relates to a colouring structure, and more particularly to a paper colouring structure.

BACKGROUND OF THE DISCLOSURE

Existing colouring books and three-dimensional model, etc., that users can add their own colours to, are usually printed with black thick edges to mark the corresponding outline of the pattern. The users then paint the pattern with brushes. However, the black thick edges are very difficult to grasp for those who have just begun to learn painting and those with weak eyesight. At the time of colouring, it is often necessary to pay attention to the outline so that the colours do not cross the edges, in order not to destroy the beauty of the finished works. In addition, when inks and colours with high water content are used to fill in the existing colouring structure, the result is often unsatisfactory due to the low water absorption of the colouring structure, such as the flow of inks and colours not being controlled and the slow absorption effect making users frequently stained with colours.

Therefore, there is a need for a colouring structure that is easier to grasp and manipulate, so as to increase users' interest in creation, and to provide an additional colouring structure to meet users' needs, such as the convenience of colouring.

SUMMARY OF THE DISCLOSURE

This application relates to a colouring structure, characterized in that it comprises a substrate, and a colouring layer disposed on at least a part of the substrate; the substrate and the colouring layer are made from different materials and have different water absorption properties, the colouring structure comprises a plurality of colouring areas and at least one separating area wherein the colouring area is at least partially defined by the separating area.

In one embodiment, the separating area has the same density as the colouring area, and the thickness of the separating area is 80 percent (%) or less of the thickness of the colouring area.

In another embodiment, the separating area has the same density as that of the colouring area, and the thickness of the separation area is 50% or less of the thickness of the colouring area.

Preferably, the separating area has a width of at least 1 millimeter.

In one embodiment, the colouring layer is a blotter paper.

In addition, a surface of the substrate is coated with a coating of high surface tension.

Preferably, the colouring layer is fixed on a surface of the substrate by an adhesive.

In one embodiment, the colouring structure may be a three-dimensional structure or a planar structure.

In one embodiment, the colouring layer contains about 80% to about 90% of wood pulp, about 5% to about 8% of water, and a small amount of glue and additive.

The colouring structure of the present application offers many advantages, with one of the advantages being that the separating area on the colouring layer provides a noticeable touch, and the user can easily grasp the outline of the pattern on the colouring structure to easily draw the pattern. At the same time, the separating area obstructs and slows the horizontal diffusion of the liquid added to the colouring layer and effectively promotes the vertical penetration of the liquid so that the user can easily grasp the flow of the liquid. Furthermore, the colouring area has good water absorption and is particularly advantageous for colours or inks with high water content, which is manifested by the fact that the colouring area can be quickly filled with a small amount of colours or inks.

The design of this application is suitable for both young and old people, and users can enjoy the pleasure of creating artworks and works as much as they like, no matter whether they have mastered painting skills or not.

DESCRIPTION OF THE DRAWINGS

The features and advantages of the present application can be further appreciated with reference to the following parts of the specification and the drawings. The same components in these drawings have the same reference label. In some cases, sub-tags are placed after a certain label and hyphen to indicate one of many similar components. Herein, similar or identical components in different embodiments (e.g., 100, 300) are numbered with a difference of 100 to clearly indicate their similarities.

Figure 1:
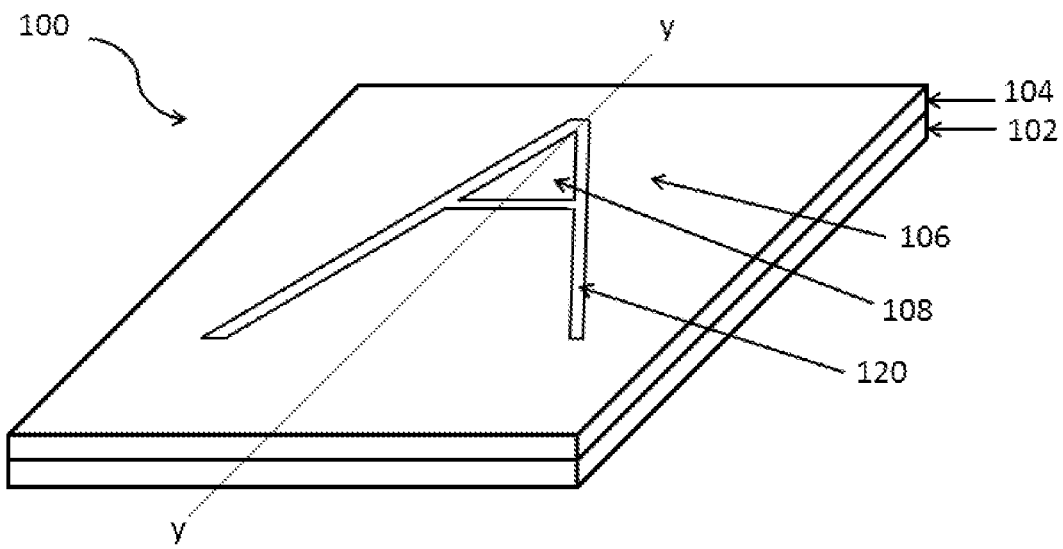
FIG. 1 is a perspective view of the colouring structure according to one embodiment of the application.

Before describing the embodiments of this application in detail, it would be appreciated that the present application is not limited to the details of construction and the arrangement of components set forth in the following content or the structures shown in the drawings. The present application can have other embodiments and may be practiced or implemented in various ways. Also, it would be appreciated that the wording and terminology used herein are for the purpose of description and should not be regarded as limiting the scope of protection.

DETAILED DESCRIPTION OF EMBODIMENTS

Embodiments of the present application relate to a colouring structure having a substrate and a colouring layer, wherein the colouring layer is provided with a colouring area and a separating area for a user to grasp the pattern engraved on the colouring structure so that the user can easily paint and enjoy the fun of it. Other different benefits and advantages brought by the various embodiments of the application will be readily apparent from the following description.

FIG. 1 shows the colouring structure according to an embodiment of the present application, wherein the colouring structure is a planar structure. The colouring structure 100 is composed of a substrate 102 and a colouring layer 104. The colouring layer 104 is fixedly adhered to the substrate 102 by an adhesive, such as glue. The substrate 102 and the colouring layer 104 are made of different materials. Specifically, both the substrate 102 and the colouring layer 104 are made of a paper material, i.e. a material made of wood pulp with the colouring layer 104 being a blotter paper with good water absorption whereas the substrate 102 being a base paper with low water absorption. This means that when a liquid is added to the colouring layer 104, the colouring layer 104 is able to quickly absorb the liquid, while the substrate with lower water absorption ability temporarily confines the liquid that has diffused in the colouring layer 104 and contacted the surface of the substrate 102 within the colouring layer 104. This design provides an additional period of time for the colouring layer 104 to fully absorb the liquid and to allow the liquid to more evenly diffuse in the layer while reducing the risk of the liquid being quickly overflowing the colouring structure 100.

Figure 2:
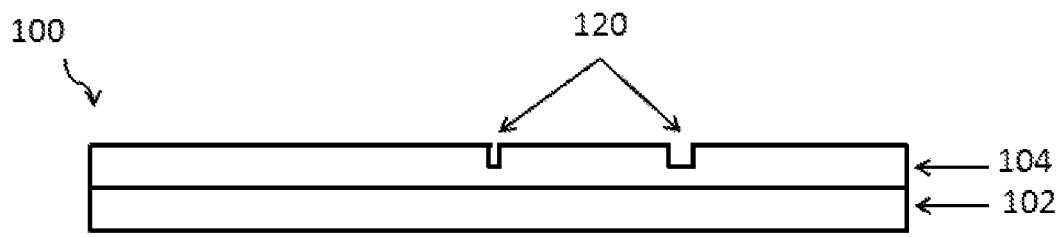
FIG. 2 is a cross-sectional view of the colouring structure in FIG. 1 along the y-direction line.

As shown in FIG. 1, a default pattern is provided on the colouring layer 104. The pattern is engraved on the colouring layer 104 by laser cutting. Specifically, a plurality of colouring areas 106, 108 and at least one separating area 120 are partitioned on the colouring layer 104 with a laser according to a pre-designed pattern, wherein the separating area 120 is formed by laser cutting. In other words, the density of the colouring areas 106, 108 is the same as the density of the separating area 120. As shown in FIG. 2, in this embodiment, the thickness of the separating area 120 is one-half the thickness of the colouring areas 106, 108 so as to at least partially define the outlines of the colouring areas 106, 108. The thickness of the separating area refers to the vertical distance between the highest surface of the separating area and the surface of the substrate with which it contacts; while the thickness of the colouring area refers to the vertical distance between the highest surface of the colouring area and the surface of the substrate with which it contacts. Further, the separating area 120 has a width of at least 1 millimeter. The width of the separating area 120 refers to the distance between the opposite sides of two adjacent colouring areas 106, 108.

When a user applies a colour or an ink on the colouring areas 106, 108, the indentations of the separating area 120 make it easy for the user to perceive and can avoid going beyond the predetermined range. Further, the design of the separating area 120 considerably restricts the flow and diffusion of a liquid, such as colour or ink, in the colouring layer 104, and controls the liquid to stay in the colouring areas 106, 108. This is because the separating area 120 impedes and slows the diffusion of the liquid in the colouring layer 104; while it provides additional surface area on the edges of the colouring areas 106, 108 to direct the liquid penetrating towards the substrate 102 of the colouring structure 100, i.e. vertical penetration. Such a design can effectively slow down the horizontal penetration of the liquid and provide a considerable period of time for the colouring areas 106, 108 to adequately absorb liquid residing on its surface, so as to reduce uncontrolled diffusion of the liquid. As described above, the colouring layer 104 has high water absorption, so when a user fills it with colour, the colour or ink can be quickly absorbed by the colouring areas 106, 108 and be effectively controlled within the range defined by the separating area 120. This is especially advantageous for colours with high water content.

In another embodiment, the separating area can be set as voids between the colouring areas without any thickness in the colouring layer. Laser cutting may be applied in this embodiment to directly cut away the structure having the same thickness or larger thickness compared to the colouring layer 104 from the substrate with the colouring layer. In this embodiment, the substrate surface may be coated with a coating of high surface tension. When a user applies liquid and the liquid is brought into the voids, the liquid is briefly held on the coating surface of the substrate, allowing the adjacent colouring areas to absorb the liquid. In this way, the finished pattern will be neat.

Figure 3:
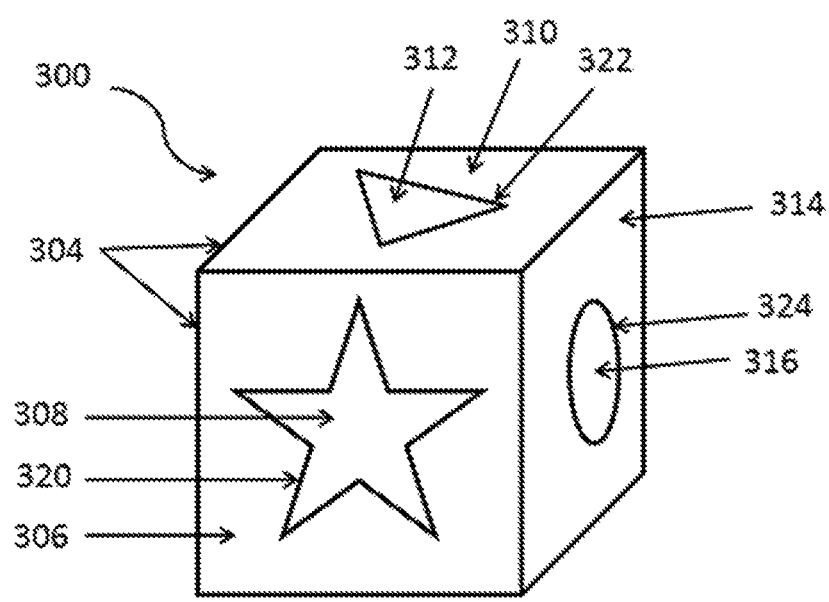
FIG. 3 is a perspective view of the colouring structure according to another embodiment of the application.

FIG. 3 shows another embodiment of the present application, wherein the colouring structure is a three-dimensional structure. The colouring structure 300 is a regular cube whose centre is constituted by a substrate (not shown). The six surfaces of the substrate are all provided with the colouring layer 304 with the colouring layer 304 engraved with patterns. Each surface has a different pattern with the surfaces consisting of different colouring areas 306, 308, 310, 312, 314, 316 and separating areas 320, 322, 324. The colouring layer 304 and the substrate are made of different materials. Specifically, the colouring layer 304 is made of blotter paper of high water absorption with a surface rougher than the surface of the substrate; while the substrate has a smooth surface with low water absorption. In this embodiment, the colouring layer 304 is coated on the surface of the substrate with an adhesive.

Now, one side of the colouring structure 300 will be described. As in the previous embodiments, the colouring areas 306, 308 are defined by the separating area 320, which has the same density as that of the colouring areas 306, 308. This is because the separating area 320 is the voids between the colouring areas 306 and 308 formed by cutting a part of the material on the colouring layer 304 by laser cutting according to preset parameters. In this embodiment, the thickness of the separating area 320 is about 30% of the thickness of the colouring areas 306, 308, and the separating area 320 has a width of about 1.5 millimeters. The definition of thickness and width are as described above. The design of the separating area 320 provides sufficient time for the colouring areas 306, 308 to quickly absorb the liquid, such as colours or inks, added to the colouring layer 304, and effectively causes the liquid to penetrate towards the substrate, minimizing the diffusion of the liquid that has been added to the colouring area 306 to another colouring area 308. At the same time, a user can more comfortably enjoy the fun of colouring by perceiving the voids in the separating area, and the anxiety caused by keeping an eye to check if the colour go beyond the limits is reduced. Furthermore, the good water absorption of the colouring areas 306, 308 is especially advantageous for colours or inks with high water content, which is manifested by the fact that the colouring areas can be quickly filled with a small amount of colour or ink with the colour or ink rapidly entering the colouring layer 304 to reach the surface of the substrate. Although the substrate has lower water absorption than the colouring layer 304, it also slowly absorbs the colour or ink to further dry the surface of the colouring layer 304 when locking the colour or ink in the colouring layer 304.

Thus, when a user adds a colour to the colouring structure, the fast water absorption (or ink absorption) of the colouring structure allows the user to more freely add colours to the colouring structure, avoids or effectively reduces accidents caused by the use of liquids having high water content, such as liquid leakage, liquid spillage and dirtying clothes or body parts over large areas, etc. Furthermore, the design of separating area provides a noticeable touch, allowing the user to easily grasp the outlines of the pattern on the colouring structure so as to more easily depict the pattern.

Therefore, the design of this application is suitable for both young and old people, and a user can enjoy the pleasure of creating artworks and works at will, regardless of the level of painting skills.

The present application is applicable to planar structure and three-dimensional structure, preferably a paper product, for example, products that need to be coloured, such as colouring books, three-dimensional models, toys, ornaments and the like, and is particularly suitable for products that can be created or assembled by a user. Users can mix different colours of inks and paints themselves, painting freely on the colouring layer with brushes and droppers, etc. Moreover, the colouring area described herein is not limited to the same colour, and the user may add one or more colours according to his/her preference.

In other embodiments of the present application, the substrate and the colouring layer of the colouring structure may be an integral structure, for example, in the final process of manufacturing the substrate, the material of the colouring layer is placed on the substrate to be finished and both are formed simultaneously at the end. Accordingly, a colouring structure having an integral construction with two materials is produced. It would be appreciated that when the substrate and the colouring layer are two separate materials, one skilled in the art understands from the present disclosure that various practical ways can be applied to combine the two together without departing from the essence of the present application.

In terms of the materials of the substrate and the colouring layer, they may be chosen depending on the actual design and purpose of the colouring structure. In some embodiments, the colouring layer is a paper material that has good water absorption, such as Chinese art paper and watercolour paper. Preferably, the colouring layer contains at least 80% of wood pulp and less than 10% of water. In one embodiment, the colouring layer contains from about 80% to about 90% of wood pulp, from about 5% to about 8% of water, and a small amount of glue and additive. Compared to the colouring layer, the substrate has lower water absorption, which is provided by adjusting the amounts of cellulose, water, sugar or the like in the material. The colouring structure of the present application is applicable to a wide range of inks and colours, with materials adjustable with corresponding inks or colours. Preferably, the present application is suitable for use with inks and colours having high water content.

The separating area and the colouring area on the surface of the colouring structure can be depicted on the colouring layer by an etching technique or more preferably cutting technique according to the predetermined pattern. The thickness of the separating area may be set according to the composition of the colouring structure and the pattern. In the case where the separating area has the same density as that of the colouring area, it is preferred that the thickness of the separating area is 80% or less of the thickness of the colouring area, which helps the colouring area to absorb the liquid added to the surface thereof, and to guide it to the substrate surface. In some embodiments, the thickness of the separating area is 50% or less of the thickness of the colouring area. In some embodiments, the thickness of the separating area may be from about 0.1 millimeter to about 1 millimeter, from about 0.2 millimeter to about 0.8 millimeter, from about 0.3 millimeter to about 0.7 millimeter, or from about 0.5 millimeter to about 0.6 mm less than the thickness of the colouring area.

Likewise, the width of the separating area may be set according to the composition of the colouring structure and the pattern. Preferably, the separating area has a width of at least 1 millimeter to provide sufficient space for a user to perceive and to effectively hinder the horizontal penetration of the liquid while defining the colouring area. In some embodiments, the colouring structure has a plurality of separating areas, with a distance of at least 1 millimeter or a distance of at least 1 millimeter to 1.5 millimeters between the separating areas.

In addition, the present application also pertains to a colouring kit, which includes a colouring structure, an ink and a package component as described herein. The package component is used to pack the colouring structure and ink respectively, allowing users to store and use them conveniently.

Whilst the present application provides detailed description of certain preferred embodiments, those skilled in the art will recognize that various modifications, additional structures and equivalents may be used without departing from the essence of this application.

What is claimed is:

1. A colouring structure, comprising:
   a substrate;
   a colouring layer disposed on at least a part of the substrate, wherein the substrate and the colouring layer are made from different materials and have different water absorption properties;
   a plurality of colouring areas on the colouring layer; and
   at least one separating area on the colouring layer, wherein the colouring areas are at least partially defined by the at least one separating area, and wherein the at least one separating area is cut into, but not all the way through, the colouring layer.

2. The colouring structure of claim 1, wherein the at least one separating area has a same density as the colouring areas, and wherein a thickness of the at least one separating area is 80% or less of a thickness of the colouring areas.

3. The colouring structure of claim 1, wherein the at least one separating area has a same density as that of the colouring areas, and wherein a thickness of the at least one separating area is 50% or less of a thickness of the colouring areas.

4. The colouring structure of claim 1, wherein the at least one separating area has a width of at least 1 millimeter.

5. The colouring structure of claim 1, wherein the colouring layer is a blotting paper.

6. The colouring structure of claim 1, wherein a surface of the substrate is coated with a coating that increases a surface tension of the substrate.

7. The colouring structure of claim 1, wherein the colouring layer is fixed on a surface of the substrate using an adhesive.

8. The colouring structure of claim 1, wherein the colouring structure is a three-dimensional structure.

9. The colouring structure of claim 1, wherein the colouring structure is a planar structure.

10. The colouring structure of claim 1, wherein the colouring layer contains from about 80% to about 90% of wood pulp, from about 5% to about 8% of water, and a small amount of glue and additive.

11. A colouring structure, comprising:
    a substrate;
    a colouring layer disposed on at least a part of the substrate, wherein the substrate and the colouring layer are made from different materials and have different water absorption properties;
    a colouring area on the colouring layer; and a separating area on the colouring area, wherein the colouring area is at least partially defined by the separating area, and wherein the separating area is cut into, but not all the way through, the colouring layer.

12. The colouring structure of claim 11, wherein the separating area has a same density as the colouring area, and wherein a thickness of the separating area is 80% or less of a thickness of the colouring area.

13. The colouring structure of claim 12, wherein the thickness of the separating area is 50% or less of the thickness of the colouring area.

14. The colouring structure of claim 13, wherein the separating area has a width of at least 1 millimeter.

15. The colouring structure of claim 14, wherein the colouring layer is a blotting paper.

16. The colouring structure of claim 15, wherein a surface of the substrate is coated with a coating that increases a surface tension of the substrate.

17. The colouring structure of claim 16, wherein the colouring layer is fixed on a surface of the substrate using an adhesive.

18. The colouring structure of claim 17, wherein the colouring layer contains from about 80% to about 90% of wood pulp, from about 5% to about 8% of water, and a small amount of glue and additive.

* * * * *